(12) United States Patent
Martin et al.

(10) Patent No.: US 11,015,498 B2
(45) Date of Patent: May 25, 2021

(54) CRANKCASE VENTILATION SYSTEM WITH A FLOW CONTROL DEVICE FOR ON BOARD DIAGNOSTICS

(71) Applicant: DAYCO IP HOLDINGS, LLC, Troy, MI (US)

(72) Inventors: Scott E. Martin, Lake Orion, MI (US); Matthew C. Gilmer, South Lyon, MI (US); David E. Fletcher, Davison, MI (US); Mitchell Emond, Shelby Township, MI (US); Chester E. Duffield, III, Warren, MI (US); David Snow, Redford, MI (US); Joseph Dennis, Farmington Hills, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 16/740,216

(22) Filed: Jan. 10, 2020

(65) Prior Publication Data

US 2020/0224565 A1    Jul. 16, 2020

Related U.S. Application Data

(60) Provisional application No. 62/791,113, filed on Jan. 11, 2019.

(51) Int. Cl.
*F02B 25/06* (2006.01)
*F01M 13/02* (2006.01)
(Continued)

(52) U.S. Cl.
CPC ...... *F01M 13/023* (2013.01); *F01M 13/0011* (2013.01); *F02B 39/00* (2013.01);
(Continued)

(58) Field of Classification Search
CPC ............ B60T 13/241; F02M 35/10229; F01M 13/023; F01M 13/0011; F02D 41/22; F16K 15/00
(Continued)

(56) References Cited

U.S. PATENT DOCUMENTS

| 1,603,834 A | 10/1926 | Boynton |
| 2,447,729 A | 8/1948 | Bertea |

(Continued)

FOREIGN PATENT DOCUMENTS

| CN | 208859006 U | 5/2019 |
| DE | 102004006632 A1 | 8/2005 |

(Continued)

OTHER PUBLICATIONS

PCT, International Search Report and Written Opinion, International Application No. PCT/US2020/013142 (dated Apr. 6, 2020) (8 pages).

*Primary Examiner* — Long T Tran
*Assistant Examiner* — James J Kim
(74) *Attorney, Agent, or Firm* — FisherBroyles, LLP; Susan M. Oiler

(57) ABSTRACT

Flow control devices herein have a housing defining a plurality of parallel conduits. The first conduit has a normally closed check valve defined to open under a first preselected pressure differential controlling flow through the first conduit in a first direction of flow. The second conduit has a normally neutral check valve defined to open under a second preselected pressure differential in a second direction of flow that is opposite the first direction of flow. The third conduit defines a restriction profile, i.e., has a restrictor, having a third preselected pressure differential. The flow (Continued)

control devices are included as part of an engine system, more specifically a crankcase ventilation breach detection system.

22 Claims, 13 Drawing Sheets

(51) Int. Cl.
| | |
|---|---|
| *F16K 15/06* | (2006.01) |
| *F16K 15/04* | (2006.01) |
| *F01M 13/00* | (2006.01) |
| *F02B 39/00* | (2006.01) |
| *F02D 41/22* | (2006.01) |
| *F02M 25/06* | (2016.01) |
| *F02M 35/10* | (2006.01) |
| *F16K 17/12* | (2006.01) |
| *F16K 17/36* | (2006.01) |

(52) U.S. Cl.
CPC ............ *F02D 41/22* (2013.01); *F02M 25/06* (2013.01); *F02M 35/10222* (2013.01); *F16K 15/048* (2013.01); *F16K 15/066* (2013.01); *F16K 17/12* (2013.01); *F16K 17/36* (2013.01); *F01M 2013/0044* (2013.01); *F01M 2013/0083* (2013.01); *F01M 2250/60* (2013.01)

(58) Field of Classification Search
USPC .................................................. 123/572–574
See application file for complete search history.

(56) References Cited

U.S. PATENT DOCUMENTS

| | | |
|---|---|---|
| 4,215,717 A | 8/1980 | Trosch |
| 5,193,577 A | 3/1993 | de Koning |
| 6,457,760 B1 | 10/2002 | Pratt |
| 6,698,719 B2 | 3/2004 | Geiser |
| 6,779,388 B2 | 8/2004 | Baeuerle et al. |
| 7,444,990 B1 | 11/2008 | Fisher et al. |
| 7,726,335 B2 | 6/2010 | Doble |
| 9,790,885 B2 | 10/2017 | Rollinger et al. |
| 9,828,953 B2 * | 11/2017 | Fletcher ................. B60T 17/02 |
| 10,024,251 B2 | 7/2018 | Pursifull et al. |
| 2010/0147270 A1 | 6/2010 | Pursifull et al. |
| 2014/0096754 A1 | 4/2014 | Monros |
| 2016/0201552 A1 * | 7/2016 | Fletcher ................ F02B 37/004 |
| | | 417/205 |
| 2016/0290193 A1 * | 10/2016 | Lemke ............... F01M 13/0011 |
| 2016/0312686 A1 * | 10/2016 | Christian ............... F01M 13/04 |
| 2017/0254426 A1 * | 9/2017 | Hampton ................ F16K 15/02 |
| 2017/0362975 A1 * | 12/2017 | Konishi .................... F02F 1/36 |
| 2018/0119830 A1 | 5/2018 | Graham et al. |

FOREIGN PATENT DOCUMENTS

| | | |
|---|---|---|
| FR | 2663392 A1 | 12/1991 |
| GB | 702875 A | 1/1954 |
| KR | 20090007697 U | 7/2009 |
| RU | 2378552 C2 | 1/2010 |

* cited by examiner

CRANKCASE VENTILATION SYSTEM WITH A FLOW CONTROL DEVICE FOR ON BOARD DIAGNOSTICS

TECHNICAL FIELD

This application relates to a crankcase ventilation breach detection system having a constant restriction of flow in the normal flow direction and free flow in the opposite direction, more particularly, to such a system achieving the same with a tuned orifice and two check valves in a parallel configuration with flow in opposite directions.

BACKGROUND

In automotive engines, on/off operation of a vacuum generator and/or accessory is frequently controlled by a gate valve in which a rigid gate is deployed across a conduit to stop the flow of a fluid (in this exemplary application, air) through the valve. Within automated or "commanded" valves, the gate is typically actuated by a solenoid and opened or closed in response to an electrical current applied to the solenoid coil. These solenoid-powered gate valves also tend to include a coil spring, diaphragm, or other biasing element which biases the gate towards an unpowered, 'normally open' or 'normally closed' position.

The pressure in an engine crankcase is ideally maintained near atmospheric pressure (ATM pressure+/−5 kPa). Furthermore, it is desirable to be able to detect any leak in the crankcase ventilation system (path from fresh air to the manifold, including all flow passageways and passageway connections) to ensure crankcase gasses are appropriately managed to avoid excessive pollutants being discharged into the atmosphere. In order to achieve these conditions, free flow (minimal restriction) of air into the crankcase is needed, which can be switched to a restricted opening, in order to conduct a pressure integrity check (and not create an excessively negative pressure in the crankcase). The gate valve approach while successful, is more expensive and takes up engine space. A more cost effective and compact system to enable the pressure integrity check of the crankcase ventilation system is desirable, especially one as disclosed herein that does not require any electrical connections to move an actuator, such as a solenoid, to operate a valve.

SUMMARY

In all aspects, flow control devices are disclosed herein that have a housing defining a plurality of parallel conduits. The first conduit has a normally closed check valve defined to open under a first preselected pressure differential controlling flow through the first conduit in a first direction of flow. The second conduit has a normally neutral check valve defined to open under a second preselected pressure differential in a second direction of flow that is opposite the first direction of flow. The third conduit defines a restriction profile, i.e., has a restrictor, having a third preselected pressure differential. In one embodiment, the first preselected pressure differential is greater than the third preselected pressure differential. In another embodiment, the second preselected pressure differential is the same or lower than the first preselected pressure differential. In yet another embodiment, the first preselected pressure differential is greater than the third pressure differential, and the second pressure differential is the same or less than the third pressure differential.

In all aspects, the flow control device has a first port in fluid communication with all of the plurality of parallel conduits and a second port in fluid communication with all of the plurality of parallel conduits. In one embodiment, the second port is shaped as a cap that is permanently attachable to an air intake. The cap has a radially outer flange and a radially inner flange, the radially outer flange being longer than the radially inner flange. In all embodiments, the flow control device can define a sensor port in the first port for connection of the first port to a pressure sensor for fluid communication between the first port and the pressure sensor. The flow control device in all embodiments may include a pressure sensor operatively connected to the sensor port.

In all aspects, the normally closed check valve has a hemispherical poppet check valve and a spring biasing the hemispherical poppet sealing member to a closed position. In the closed position, the hemispherical poppet check valve seats a convex surface of the hemispherical poppet sealing member against a convex surface of the first conduit.

In all aspects, the normally neutral check valve has a sealing disc translatable between an open position and a closed position in response solely to a pressure differential in the second conduit. The sealing disc is flexible and is bowl-shaped in the open-position and is flat in the closed position.

In another aspect, crankcase ventilation breach detection systems for internal combustion engines are disclosed that include any of the flow control devices disclosed herein. The internal combustion engines have a crankcase and an intake manifold, a positive crankcase ventilation valve in fluid communication between the crankcase and intake manifold to regulate the flow of blow-by-gas from the crankcase to the intake manifold, a crankcase ventilation tube in fluid communication with air from an air intake and the blow-by-gas, and the flow control device within the fluid flow path of the crankcase ventilation tube. In all aspects, the internal combustion engine can have a turbocharger and the crankcase ventilation tube connects upstream of the compressor of turbocharger.

The flow control device in the engine system can have a cap that is permanently attachable to an air intake. The cap terminates with a radially outer flange and a radially inner flange that are adhered to an opening of the air intake or welded to the opening of the air intake. The welding of the cap to the air intake can be by spin welding, vibration welding, or induction welding.

In all aspect of the system, a pressure sensor is present. In one embodiment, the pressure sensor is independent of the flow control system and is positioned to send the flow between the first port and the crankcase. In another embodiment, the flow control device includes a sensor port in the first port and the pressure sensor is operatively connected to the sensor port. In all embodiments, the pressure sensor indicates an error, i.e., a leak in the system, if the sensor detects increased vacuum levels because the normally closed check valve did not open or if the sensor detects a higher than normal pressure because the normally neutral check valve did not open.

DETAILED DESCRIPTION

Figure 1:
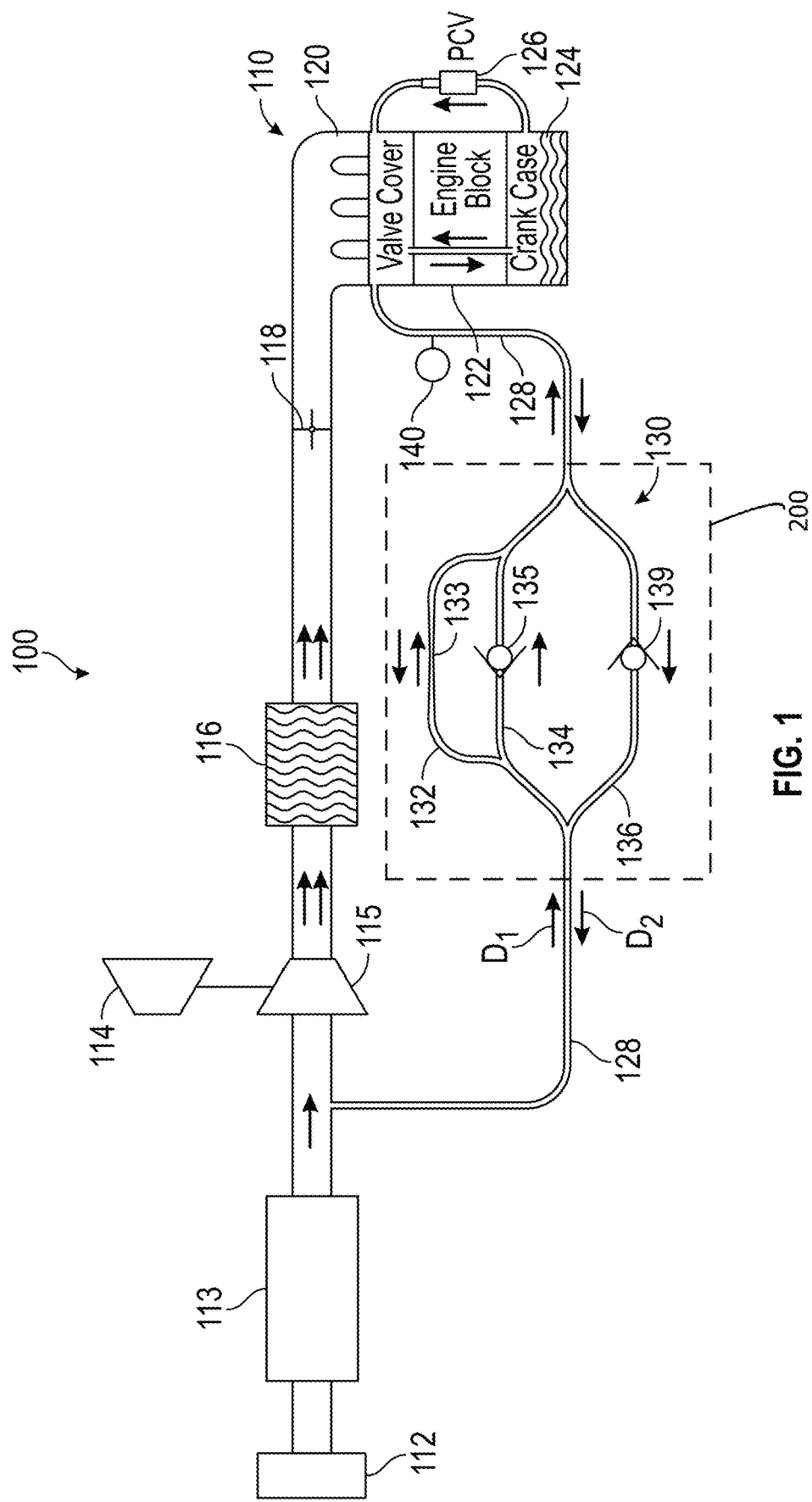
FIG. 1 is a schematic illustration of a turbocharged engine having a crankcase ventilation breach detection system defining a flow control system having three conduit pathways in parallel, one with a restrictor and the others each with a check valve controlling flow in opposing directions under preselected engine conditions.
Figure 2:
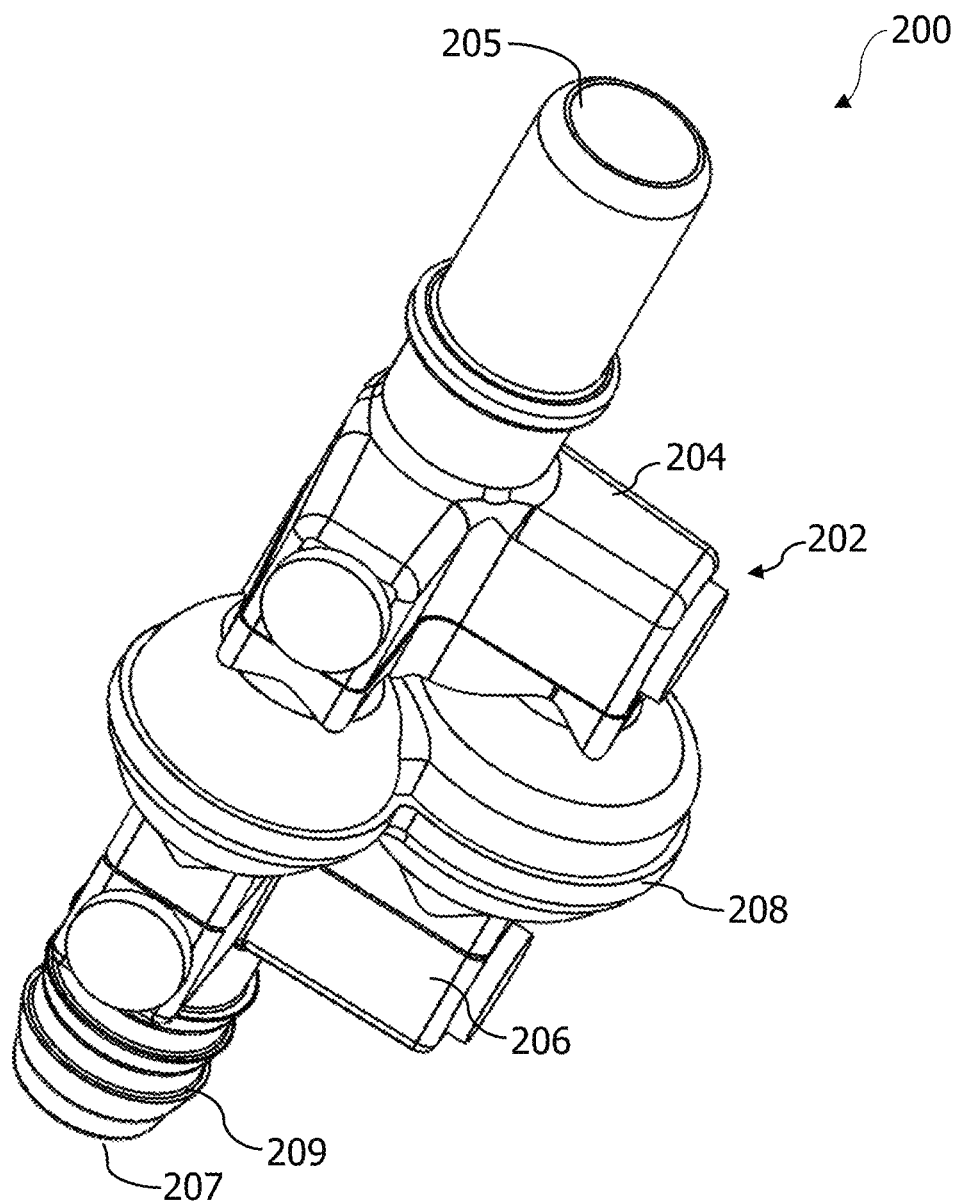
FIG. 2 is a side perspective view of a flow control device.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIG. 1 illustrates one embodiment of an engine system 100, which may be a vehicle engine system that is a turbocharged or supercharged system. The engine system 100 is configured for combusting fuel vapor accumulated in at least one component thereof and includes a multi-cylinder internal combustion engine 110. The engine system 100 receives air from an air intake 112, which may include an air filter 113 (also known as an air cleaner). The engine system of FIG. 1 is a turbocharged engine system having a turbocharger 114, but could just as equally be a supercharged engine system. The compressor 115 of the turbocharger 114 receives air from the air intake 112, compresses the air, and directs a flow of compressed air (or boosted air) downstream through a charge air cooler or intercooler 116 and then to a throttle 118. The throttle 118 controls fluid communication between the compressor 115 and the intake manifold 120 of the engine 110. The throttle 118 is operable using known techniques to vary an amount of intake air provided to the intake manifold 120 and the cylinders of the engine. In alternative embodiments, the intercooler 116 may be positioned downstream of the throttle, and as such, may be housed in the intake manifold.

Still referring to FIG. 1, intake manifold 120 is configured to supply intake air or an air-fuel mixture to a plurality of combustion chambers of engine 110 located within the engine block 122. The combustion chambers are typically arranged above a lubricant-filled crankcase 124 such that reciprocating pistons of the combustion chambers rotate a crankshaft (not shown) located in the crankcase 124. Unburned fuel and other combustion products may escape past each piston and/or valve guides from the engine block into the crankcase 124. The resulting gases in the crankcase, often referred to as "blow-by" gases may excessively pressurize the crankcase 124 if not vented therefrom. Engine 110 includes a crankcase ventilation system, which serves to vent blow-by gases from the crankcase 124 to intake manifold 120.

Still referring to FIG. 1, the crankcase ventilation system includes a positive crankcase ventilation valve 126 in fluid communication between the crankcase 124 and the intake manifold 120, to regulate the flow of blow-by gases from the crankcase to the intake manifold, and a conduit known as a crankcase ventilation tube 128 placing the crankcase 124, in particular, the blow-by gas in fluid communication with clean air from the air intake 112. Here, the crankcase ventilation tube 128 is in fluid communication upstream of the compressor 115. The crankcase ventilation tube 128 divides into a flow control system 130 that includes a pressure sensor 140 positioned between the flow control system 130 and the crankcase 124. In the flow control system detection of no pressure differential by the pressure sensor 140 indicates a breach in the system.

As represented by the box surrounding the flow control system and, optionally, the pressure sensor 140, rather than being separate conduits, check valves, restriction, and sensor, these are integrated as flow control device 200, shown in more detail in the embodiments in FIGS. 2-15. The flow control system 130 in the embodiment of FIG. 1 and hence the flow control device 200 include three parallel conduits, one conduit 132 defines a restriction profile 133, another conduit 134 has a normally closed check valve 135 controlling flow therethrough from the air intake to the crankcase, and yet another conduit 136 has a normally neutral check valve 139 controlling flow therethrough from the crankcase to the air intake. The normally closed check valve 135 opens under a first preselected pressure differential, the second check valve opens under a second preselected pressure differential, and the restriction profile has a third preselected pressure differential that is the same in either direction of flow therethrough. As labeled in FIG. 1, a first direction $D_1$ (the normal flow direction) is from the air intake upstream of the compressor to the crankcase and the second direction $D_2$ is the opposite of the first direction. Flow in the first direction $D_1$ through the flow control device 200 is through the open hemispherical poppet check valve as shown by the arrows in FIG. 4. Flow in the second direction $D_2$ through the flow control device 200 is through the open normally neutral check valve as shown by the arrows in FIG. 5.

A "normally closed" check valve is in the closed position until the pressure differential (change in pressure) between the inlet and the outlet is sufficient to overcome the spring holding the poppet in the closed position. A "normally neutral" check valve is neither open nor closed and depends on sufficient pressure differential to overcome the minimal mass of the disc to be in either the open or closed position, depending on the flow direction. The normally closed check valve 135 can be tuned to open within 1 kPa to 2 kPa of the preselected pressure differential of a control system for a particular engine system based on the setpoints selected for said engine system. In one embodiment, the preselected pressure differential is a change of about 2.5 kPa. When used as a "normally closed" check valve the opening pressure differential can be tuned by varying the spring rate and preselected spring force at installation of the spring.

The flow control system of FIG. 1 is set to have the first preselected pressure differential of the normally closed check valve 135 greater than or equal to the third pressure differential of the restrictor 133, and the second pressure differential of the normally neutral check valve 139 is the same or less than the third pressure differential of the restrictor 133. The first, second and third pressure differentials are in a range of about 1.5 kPa to about 4 kPa, more preferably about 2.5 kPa to about 3.5 kPa. "About" herein means+/−0.3 kPa. In one embodiment, the normally closed check valve 135 opens at about a 2.5 kPa pressure differential at 15 slpm and at about a 3.5 kPa pressure differential at 30 slpm, while the normally neutral check valve 139 opens at about a 0.1 kPa pressure differential at 15 slpm and at about a 0.4 kPa pressure differential at 30 slpm, with the restrictor orifice being continuously open and constructed for a 2.5 kPa pressure differential at 15 slpm.

Turning now to FIGS. 1-5, a first embodiment of a flow control device 200 is disclosed that has a housing 202 having a first housing portion 204 defining a first port 205 and a second housing portion 206 defining a second port 207 that are sealingly fixed together with a fluid-tight seal at flange 208 and collectively define an internal cavity 210. The first port 205 and the second fluid port 207 are both in fluid communication with the internal cavity 210. The internal cavity 210 has larger dimensions than the first port 205 and the second port 207 and splits into three parallel conduits 132, 134, 136 each of which are in fluid communication with the first port 205 and the second port 207. In the illustrated embodiment, the first port 205 and the second port 207 are positioned opposite one another to define a generally linear flow path through the flow control device 200, but is not limited to this configuration. In another embodiment, the first and second ports may be positioned relative to one another at an angle of less than 180 degrees. Each of the exterior ends of the first port 205 and the second port 207 can include connecting features 209, such as flanges, ribs, grooves, barbs, etc. to attach a hose thereto or a duct of a device within the engine system. The first port 205 may include a sensor port 211 for a sensor such as a pressure sensor to detect changes in pressure that will indicate a leak in the engine system. Alternately, a sensor may be placed in the system between the first port and the crankcase.

Figure 3:
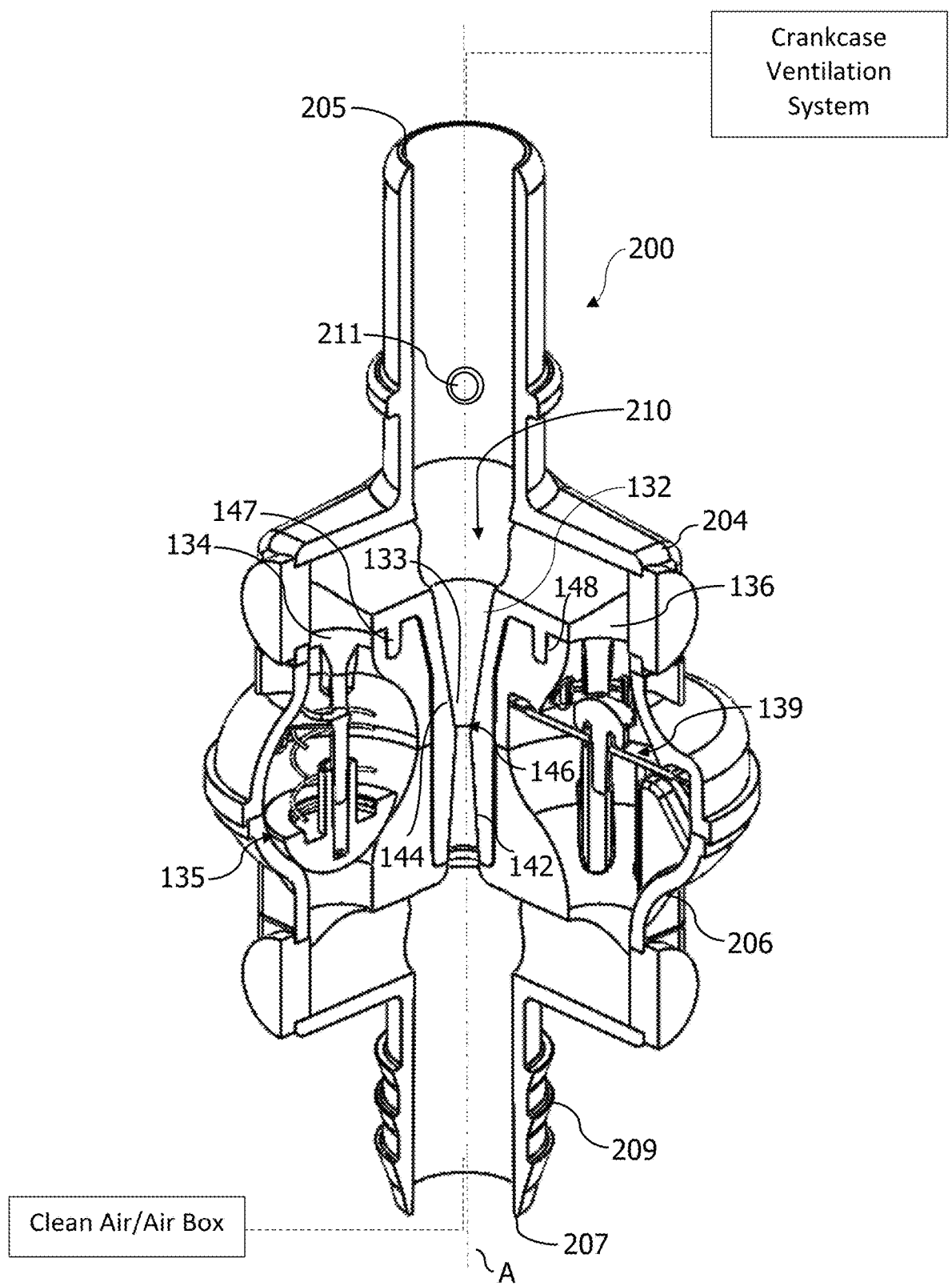
FIG. 3 is a longitudinal, cut-away view of one embodiment of the flow control device.

Referring to FIG. 3 the first conduit 132 defining the restrictor 133 is generally positioned centrally in the flow control device 200 between the normally closed check valve 135 and the normally neutral check valve 139. In this embodiment, the first conduit 132 is aligned with the first port 205 and the second port 207 along a central longitudinal axis A of the housing. The first conduit 132 may be molded of a suitable plastic separately from the first housing portion 204 and the second housing portion 206 and is inserted therein in registration therewith using mating registration features 147, 148. The restrictor 133 has an internal profile having upstream and downstream portions 142, 144 converging toward one another and defining a throat 146 where the two meet. Both portions 142, 144 are circular, when viewed in a transverse cross-section, and each narrow according to a parabolic or hyperbolic function along its length, which meet at the throat 146. The internal profile of the upstream and downstream portions 142, 144 may be symmetrical, mirror image of one another. The throat diameter is the parameter that determines or sets the maximum mass flow rate. A larger diameter for the throat equates to a larger mass flow rate. Here, the throat diameter is in a range of about 2 mm to 5 mm, more preferably about 2 mm to about 3 mm. For the throat diameter, "about" means+/−0.1 mm.

Figure 4:
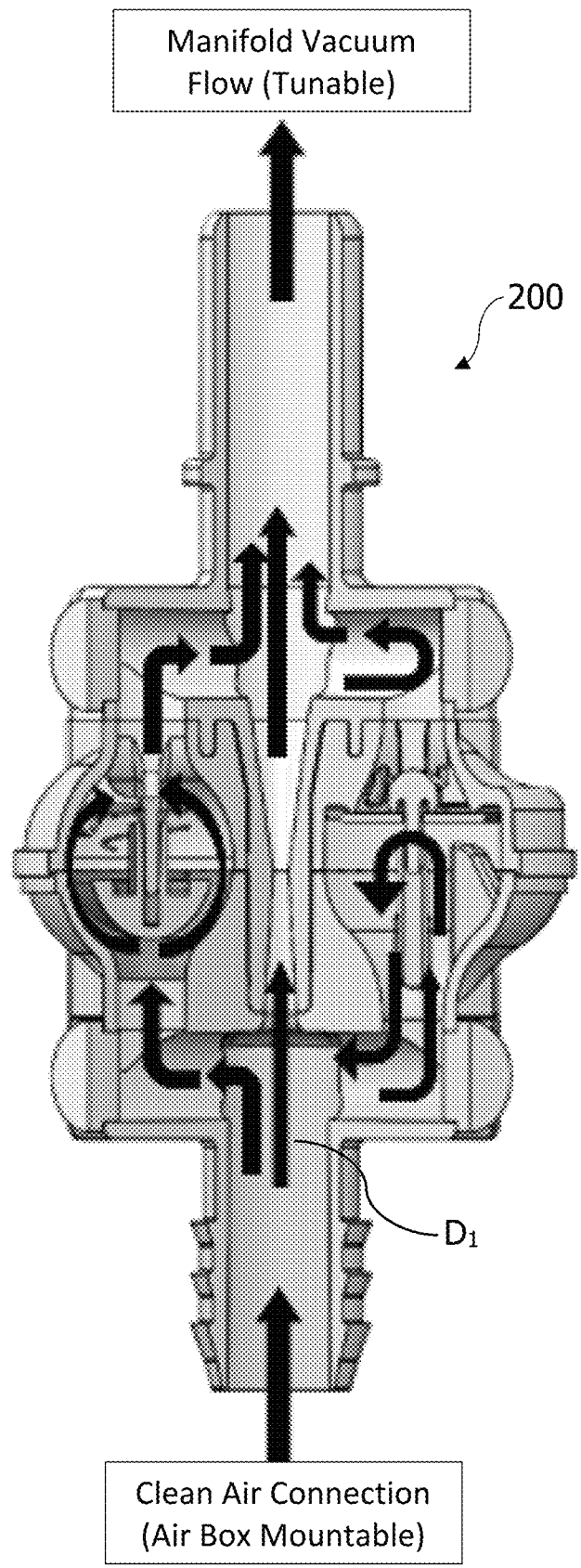
FIG. 4 is a longitudinal, cut-away view of the flow control device FIG. 2 showing the fluid flow path in the normal flow direction through the hemispherical poppet check valve.
Figure 5:
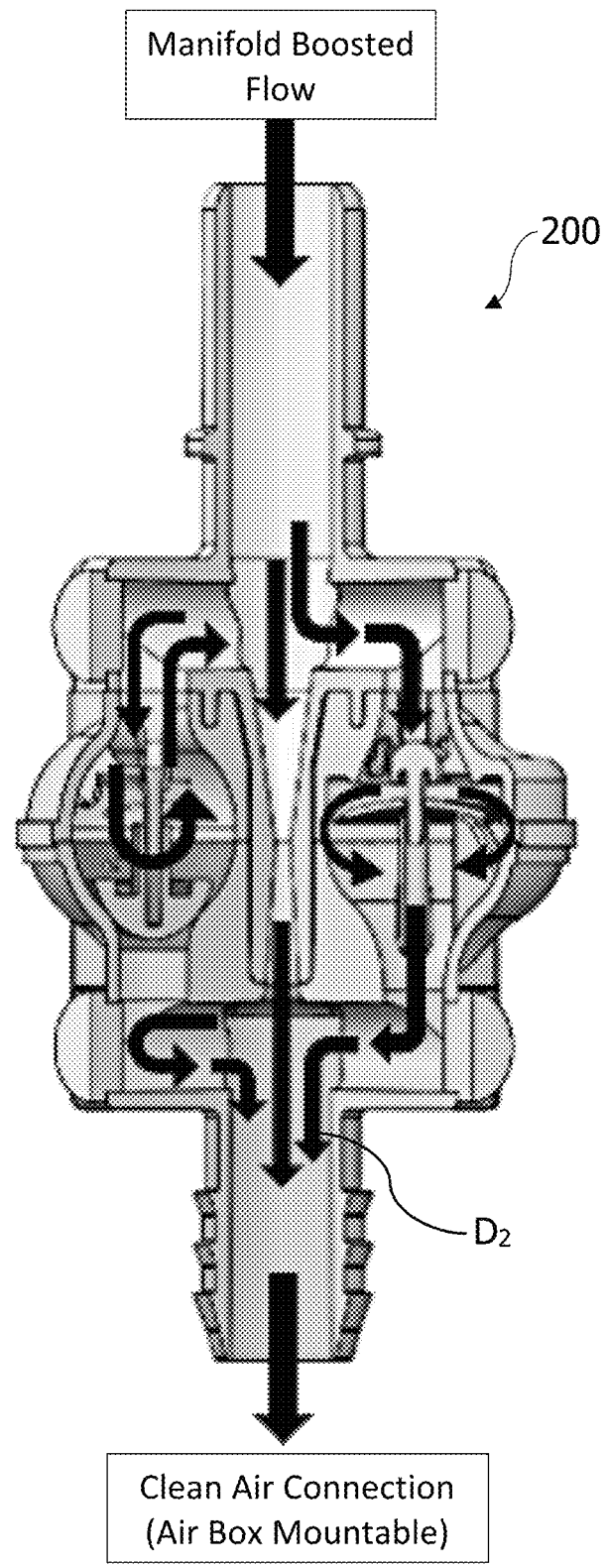
FIG. 5 is a longitudinal, cut-away view of the flow control device FIG. 2 showing the fluid flow path in the opposite flow direction through the second check valve.
Figure 6:
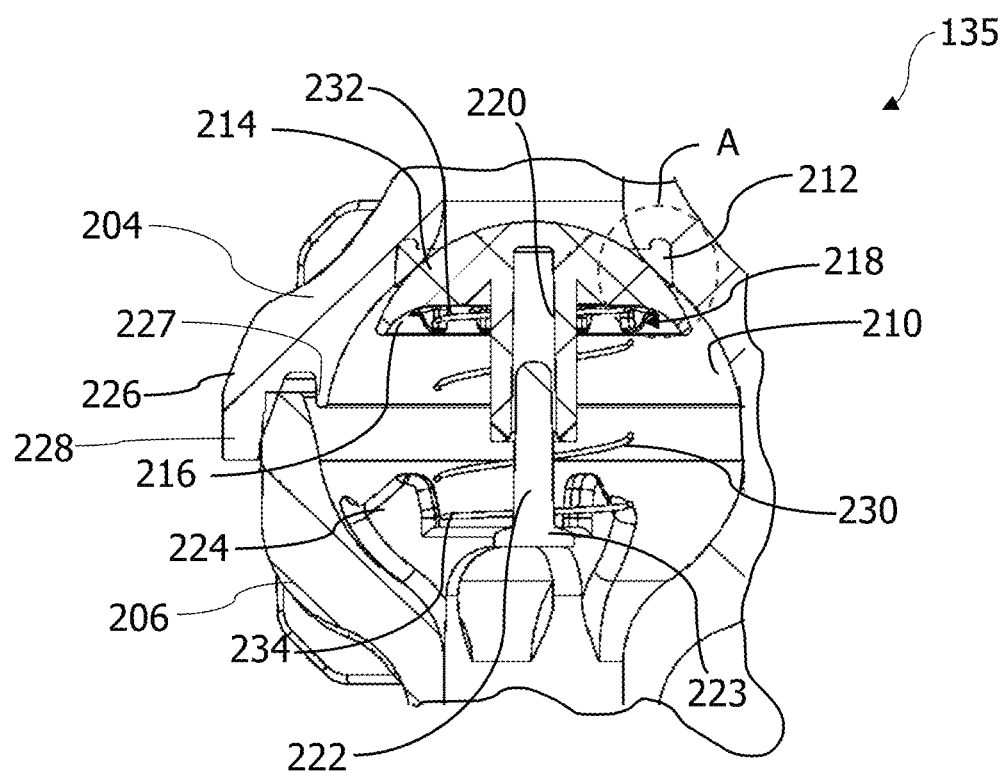
FIG. 6 is a longitudinal, cross-sectional view of the hemispherical poppet check valve of the flow control device of FIG. 2.
Figure 7:
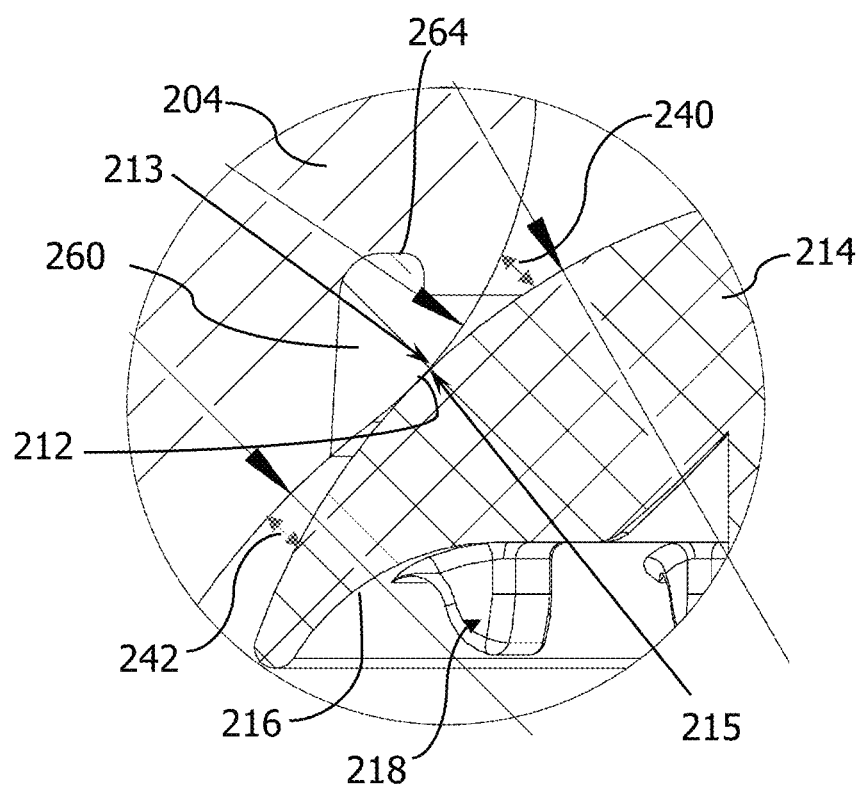
FIG. 7 is an enlarged view of the seal in the circle A of FIG. 6.

The normally closed check valve 135 is a hemispherical poppet check valve that is spring biased into the closed position as illustrated in FIG. 3 and FIGS. 6-9. The hemispherical poppet check valve 135 has an internal cavity 210 defined by the fluid tight connection of the first housing portion 204 and the second housing portion 206. The internal cavity 210 is generally spherically shaped and defines an annular seat 212 for engagement with a hemispherical poppet sealing member 214, which is translatable between a closed position against the annular seat 212 (FIGS. 3 and 5-6) and an open position (FIG. 4). The generally spherical shape of the internal cavity 210 complements the shape of the hemispherical poppet sealing member 214 and provides a low restriction flow path in the open position. The annular seat 212 in a longitudinal cross-section through the check valve 135, as shown in FIG. 6, defines a convex spherical radius as indicated by arrow 213 in FIG. 7. The convex spherical radius of the annular seat 212 is preferably positioned or formed at a transition from the first port 205 into the internal cavity 210. The internal cavity 210 has a generally spherical shape as noted above and, in the closed position, a convex surface of the hemispherical poppet sealing member 214 as indicated by arrow 215 in FIG. 7 is engaged with the convex spherical radius 213 of the annular seat 212.

Referring to FIG. 7, the convex surface-convex surface seal is shown as an enlarged image. This seal forms a tangent seal interface that is insensitive to slight misalignment of the hemispherical poppet sealing member 214 when closing. A slightly misaligned hemispherical poppet sealing member will still have good seal integrity, approximately 0.5 scc/m or less. As seen, the interior of the first housing portion 204 has, in a longitudinal cross-section, a partial "S" shaped curve centered about the convex spherical radius 213 that defines gaps 240, 242 between the hemispherical poppet sealing member and the housing above and below the convex surface-convex surface seal, based on the orientation of the figure to the page.

Turning back to FIG. 6, to aid in seal alignment, the internal cavity 210 has a pin 222 centrally positioned and protruding into the cavity opposite the annual seat 212. The hemispherical poppet valve 214 has a cupped underside 216 defining a first seat 218 for the spring 230 and has a hollow stem 220 protruding from the cupped underside 216 toward the pin 222 and receives the pin 222 therein for translation of the hemispherical poppet sealing member 214 along the pin 222. When spring 230 is present, a first end 232 of the spring 230 is seated and retained by first seat 218 in the cupped underside 216 of the hemispherical poppet sealing member 214 and a second end 234 of the spring 230 is seated and retained be a second seat 224 defined by the second housing portion 206 and protruding into the internal cavity proximate a base 223 of the pin 222. The cupped underside 216 of the hemispherical poppet sealing member 214 provides a large restriction to fluid flow in the "non-flow direction" represented by the arrows in FIG. 5, thereby producing sufficient force to translate the sealing member to the closed position, even without the spring force provided by the spring, if desired.

Referring to FIGS. 6-9, in all embodiments, one or both of the annular seat 212 and the hemispherical poppet sealing member 214 can include a ring of elastomeric sealing material 260 (FIG. 7) to define the convex spherical radius 213 of the annular seat 212 or to define the portion of the convex surface 262 of the hemispherical poppet sealing member 214 (FIGS. 8 and 9) that engages the annular seat 212 in the closed position. However, as shown in FIG. 3, a ring of elastomeric sealing material is not required. The ring of elastomeric sealing material 260 matches (is flush with) the partial "S" shaped curved contour of the first housing portion 204 so as not to create a flow restriction, in the open position and the ring of elastomeric sealing material 262 matches (is flush with) the hemispherical surface of the hemispherical poppet sealing member 214 so as not to create a flow restriction, in the open position. The ring of elastomeric sealing material 260, 262 is insert molded or co-molded as part of one or both of the annular seat 212, i.e., first housing portion 204, and the hemispherical poppet sealing member 214. Either or both of the rings of elastomeric sealing material 260, 262 may include an annular lip 264 best seen in FIG. 7 to help retain the molded elastomeric sealing material 260, 262 in place in its respective member.

The ring of elastomeric sealing material may be formed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity at both low pressure differentials (such as 5 kPa) and at high pressure differentials (such as 200 kPa), and blends thereof.

Figure 8:
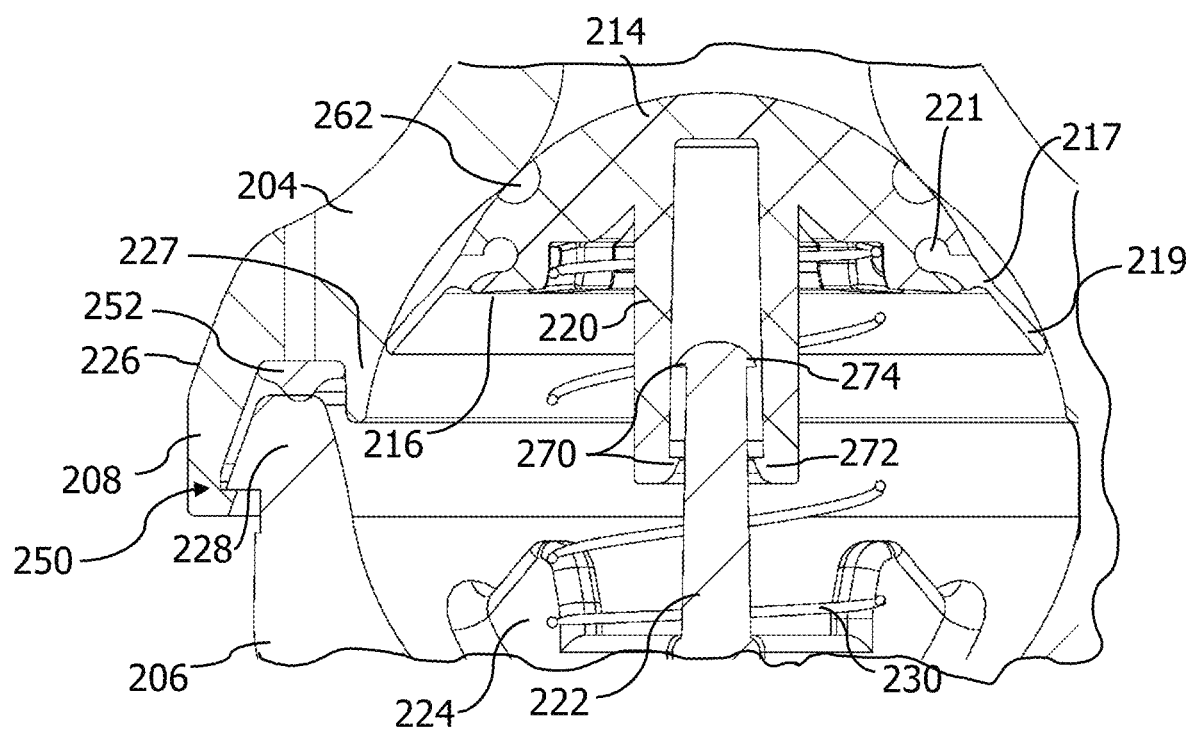
FIG. 8 is longitudinal, cross-sectional view of a second embodiment of a hemispherical poppet check valve.
Figure 9:
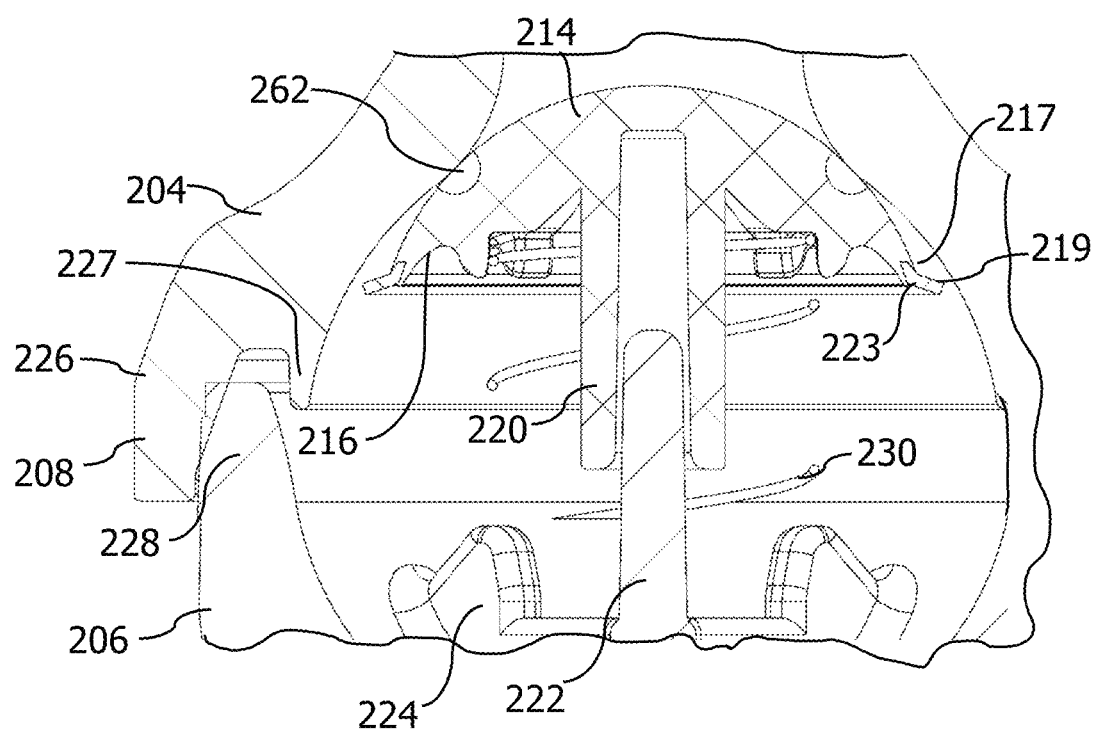
FIG. 9 is longitudinal, cross-sectional view of a third embodiment of a hemispherical poppet check valve.

In all embodiments, the hemispherical poppet sealing member 214 has a cupped underside 216 defining an outer rim 217. Referring now to FIGS. 8 and 9, the outer rim 217 can include an elastomeric flange 219 extending radially outward that, in the closed positioned, forms a clearance fit or an interference fit with a surface of the internal cavity 210. This elastomeric flange 219 enhances the ability of the hemispherical poppet sealing member 214 to close under low reverse flow conditions. The elastomeric flange 219 is insert molded or co-molded to the hemispherical poppet sealing member 214 and may include a head 221 inserted into the hemispherical poppet sealing member 214 as shown in FIG. 8. The elastomeric flange 219 as shown in FIG. 9 may include a hinge feature 223 that allows the elastomeric flange 219 to bend out of the way in response to the pressure differentials in the system to maintain minimal restrictions on the fluid flow through the check valve in the open position, i.e., the flange 219 bends away from the surface of the internal cavity 210 toward the stem 220 and the pin 222.

With reference to all embodiments, best seen in FIGS. 8 and 9, the first housing portion 204 terminates away from the first port 205 with a double flanged end 226, wherein an interior flange 227 of the double flange is shorter than an exterior flange 208 of the double flange and the interior flange 227 is contoured to lie radially inward of a rim 228 of the second housing portion 206 to collectively define the generally spherical shape of the internal cavity 210. The spherical radius and/or the radial position of spherical radius center of the first housing portion's profile is slightly less than the spherical radius and/or the radial position of spherical radius center of the second housing portion's profile, which creates an "overlap" of the interior flange 227 with the rim 228 described above and provides a low restriction flow path as well as low audible noise in the check valve 135.

The exterior flange 208 of the first housing portion 204 and the rim 228 of the second housing portion 206 can have a snap-fit connection 250 as shown in FIG. 8. In all embodiments, the first housing portion 204 and the second housing portion 206 can be formed of a plastic material suitable for combustion engine environments and can be spin-welded together. As shown in FIG. 8, the double flange end 226 of the first housing portion 204 can include an annular bead of sealing material 252 between the interior flange 227 and the exterior flange 208 to provide additional material for the spin weld.

Referring again to FIG. 8, the open end 272 of the stem 220 and the head 274 of the pin 222 can have snap-fit features 270 to assist in maintaining the position of the hemispherical poppet sealing member 214 during assembly of the check valve 135.

Figure 10:
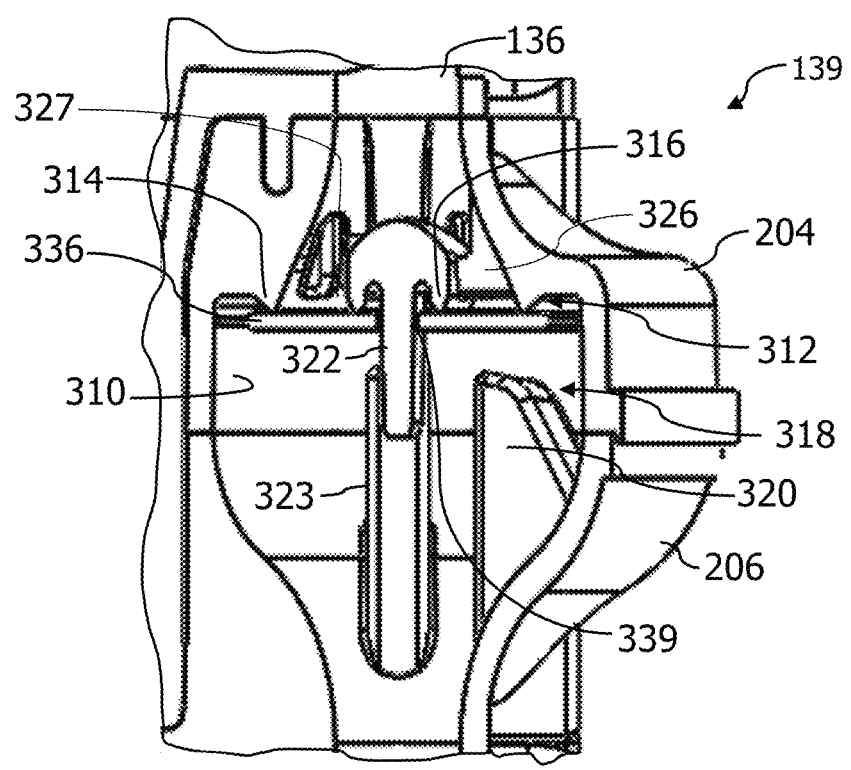
FIG. 10 is a longitudinal, cut away view of the second check valve of the flow control device of FIG. 2.

Turning now to FIG. 10, the normally neutral check valve 139 has an internal cavity 310 defined within the third conduit 136 formed by the fluid tight connection of the first housing portion 204 to the second housing portion 206. The normally neutral check valve 139 has a pin 322 defined by one of the first or second housing portions 204, 206 and the other housing portion defines a sleeve 323 in which the pin 322 is received when the first and second housing portions are mated together. The sealing disk 336 has a central bore 339 therethrough that receives the pin 322 such that the sealing disc 336 is seated upon the pin 322. The sealing disc 336 floats and translates along the pin 322 between an open position and a closed position based on pressure differentials in the system. The sealing disc 336 is not a spring biased sealing member.

The portion of the housing 202 defining the internal cavity 310 includes an internal first seat 312, here collectively a first annular seal bead 314 and a second annular seal bead 316, upon which the sealing disc 336 seats when the check valve is "closed," as shown in FIGS. 4 and 10. The second annular seal bead 316 is radially inward of the first annular seal bead 314. A second seat 318 is defined by a plurality of radially spaced fingers 320 extending into the internal cavity 310 from an interior surface of the internal cavity that is more proximate the second port 207 and the air box of the engine system. The plurality of radially spaced apart fingers 320 have a pre-selected length that provides a distance between the first seat 312 and the second seat 318, thereby enabling the sealing disc 336 to translate along the pin from the closed position to the open position. In the open position the sealing disc 336 is elastically flexed against the plurality of radially spaced fingers 320 as shown in FIG. 5.

The pin 322 is typically centrally positioned within the internal cavity 310 and a plurality of ribs 326 comprising connecting ribs and/or partial ribs 327 as disclosed in any of the configurations disclosed in U.S. Pat. No. 10,107,240 extend radially outward from the pin 322 or toward the pin 322 to subdivide the flow path into a plurality of conduits to direct the fluid flow around the periphery of the sealing disk 336 as shown by the arrows in FIG. 5 when the check valve 200 is elastically flexed in the open position.

The sealing disk 336 can have a constant thickness across its diameter as illustrated in the figures, thereby being a flat planar disc, or it can be a stepped disk as described in co-owned U.S. Pat. No. 10,107,240. The sealing disc 336 is elastically flexible to bend toward the second seat 318 in response to a preselected pressure differential across the normally neutral check valve 139. The sealing disc 336 transforms between a flat shape in the closed position to a shallow bowl shape in the open position and back again. The sealing disc 336 readily flexes when there is a pressure differential from the side of the first seat 312 to the second seat 318, i.e., higher pressure is at the first seat 312.

The sealing disc 336 may be or include an elastomeric material suitable for use in fluid communication with blow-by-gas from the crankcase ventilation system of an internal combustion engine, i.e., is durable when exposed to temperatures and pressures associated with such an environment. In one embodiment, the sealing disc 336 may be or include one or more of a natural rubber, synthetic rubber, silicone rubber, fluorosilicone rubber, fluorocarbon rubber, nitrile rubber, EPDM, PTFE, and combinations thereof, but is not limited thereto.

Figure 11:
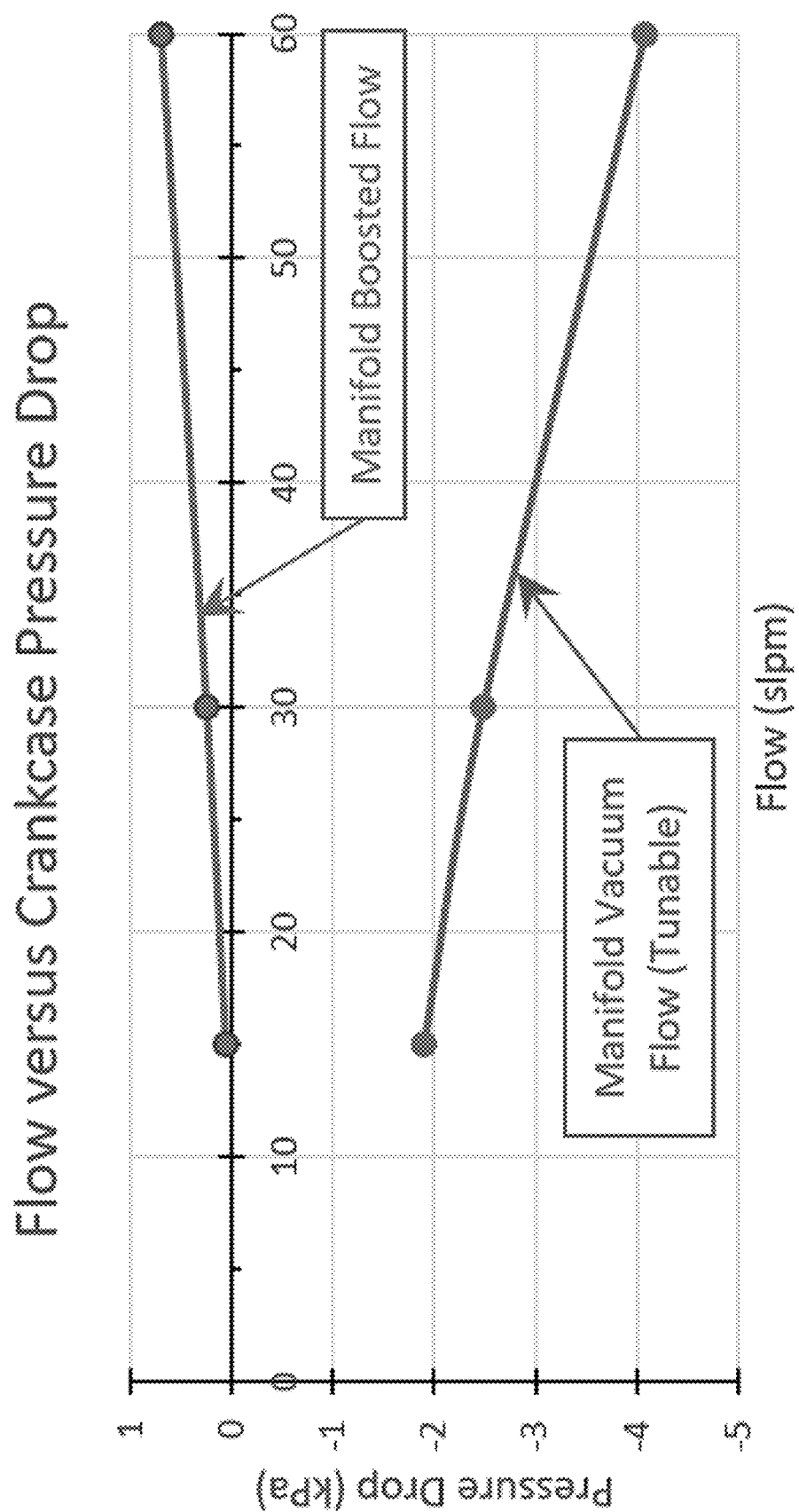
FIG. 11 is a graph the fluid flow through the flow control device versus the crankcase pressure differential.

Turning now to FIG. 11, the graph of the flow rate versus the pressure drop experienced at the crankcase shows that in manifold vacuum there is a detectable amount of pressure drop to meet diagnostic requirements, but minimal increase in pressure drop as flow increases so as not to cause engine damage, while in manifold boost there is minimal pressure drop as desired. This allows diagnostic compliance anytime there is manifold vacuum.

Turning now to FIGS. 12-15, a second embodiment of a flow control device, generally designated 300, is disclosed that has a housing 302 having a first housing portion 304 defining a first port 305 and a second housing portion 306 defining a second port 307 that are sealingly fixed together with a fluid-tight seal at flange 308 and collectively define an internal cavity 310. The first port 305 and the second fluid port 307 are both in fluid communication with the internal cavity 310. The internal cavity 310 has larger dimensions than the first port 305 and the second port 307 and splits into three parallel conduits 132, 134, 136, each of which are in fluid communication with the first port 305 and the second port 307. The first conduit 132 defines a restriction profile 133, the second conduit 134 has a normally closed check valve 135 controlling flow therethrough from the air intake to the crankcase, and the third conduit 136 has a normally neutral check valve 139 controlling flow therethrough from the crankcase to the air intake. The normally closed check valve 135 opens under a first preselected pressure differential, the second check valve opens under a second preselected pressure differential, and the restriction profile has a third preselected pressure differential that is the same in either direction of flow therethrough. Flow in the first direction $D_1$, from the air box to the intake manifold, through the flow control device 300 is through the open hemispherical poppet check valve as shown by the arrows in FIG. 13. Flow in the second direction $D_2$ through the flow control device 200, from the intake manifold to the air box, is through the open, normally neutral check valve as shown by the arrows in FIG. 14. In this embodiment, the first port 305 and the second port 307 are positioned opposite one another to define a generally linear flow path through the flow control device 300, but are not limited to this configuration. In another embodiment, the first and second ports may be positioned relative to one another at an angle of less than 180 degrees.

Figure 12:
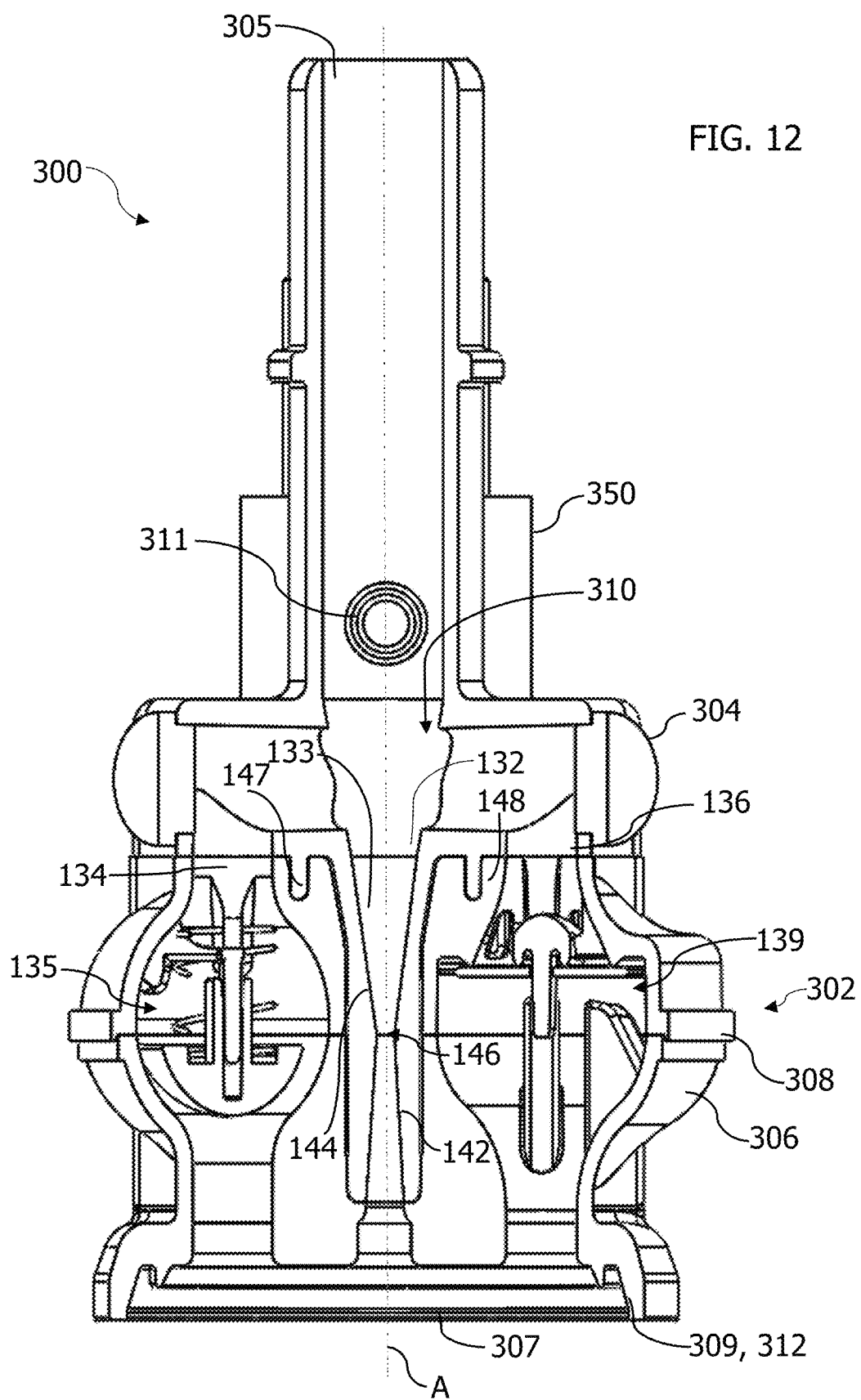
FIG. 12 is a longitudinal, cut away view of a second embodiment of a flow control device.
Figure 13:
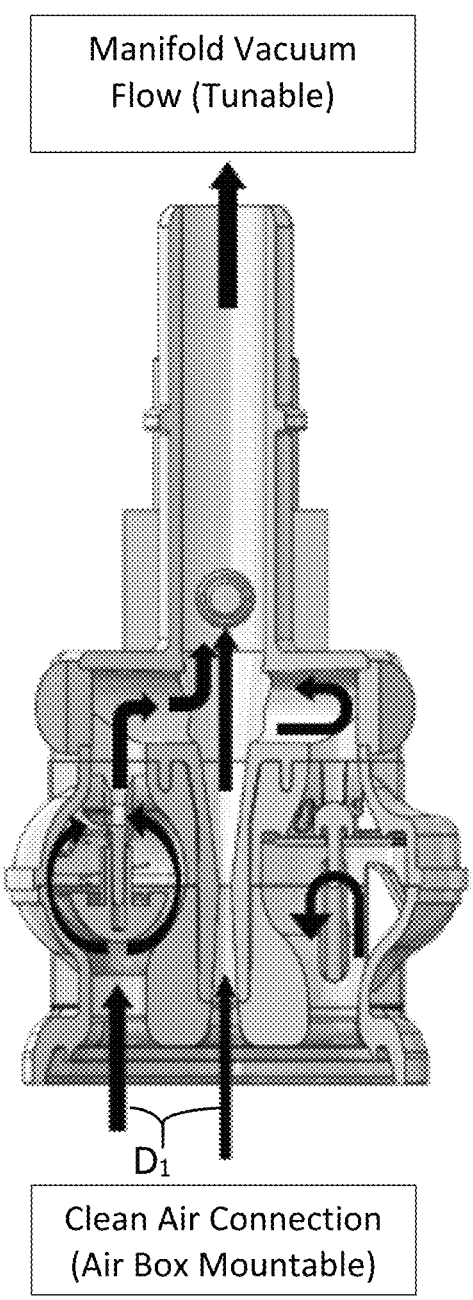
FIG. 13 is a longitudinal, cut-away view of the flow control device FIG. 12 showing the fluid flow path in the normal flow direction through the hemispherical poppet check valve.
Figure 14:
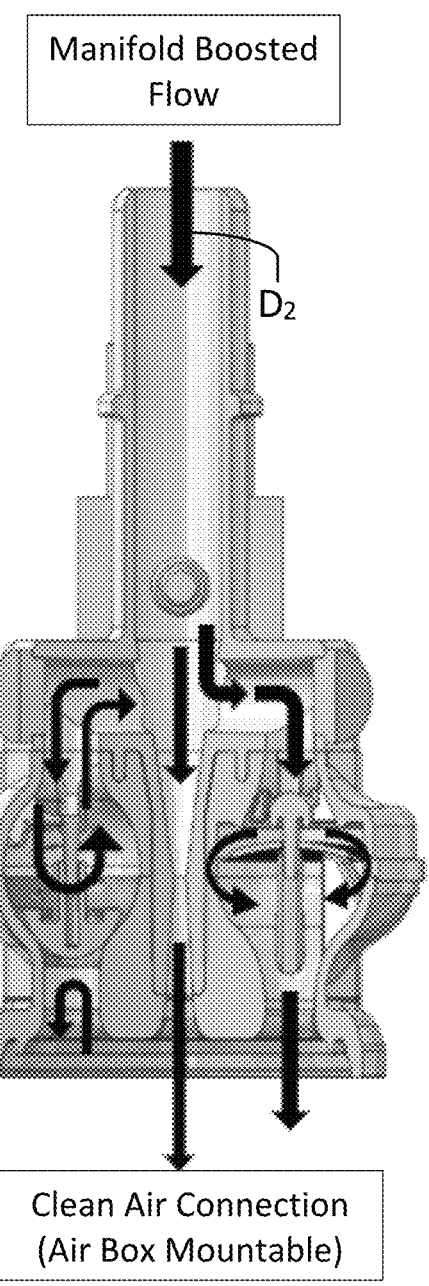
FIG. 14 is a longitudinal, cut-away view of the flow control device FIG. 12 showing the fluid flow path in the opposite flow direction through the second check valve.

Each of the exterior ends of the first port 305 and the second port 307 can include connecting features, such as flanges, ribs, grooves, barbs, etc. to attach a hose thereto or a duct of a device within the engine system. In the embodiment of FIG. 12, the second port 307 includes a connecting feature 309, a cap for permanent connection to a duct of a device within the engine system, such as the air box. The cap 309 has a dual flanged terminal end 312 which receives a rim of the duct between the flanges. The dual flanged terminal end 312 lends itself to spin-welding the flow control device 300 to the duct. Alternately, the dual flanged terminal end can be attached to the duct by adhesive, other forms of welding, such as vibration welding or induction welding, heat-bonding, laser-bonding, or other methods known for mating plastic components in engine systems.

Figure 15:
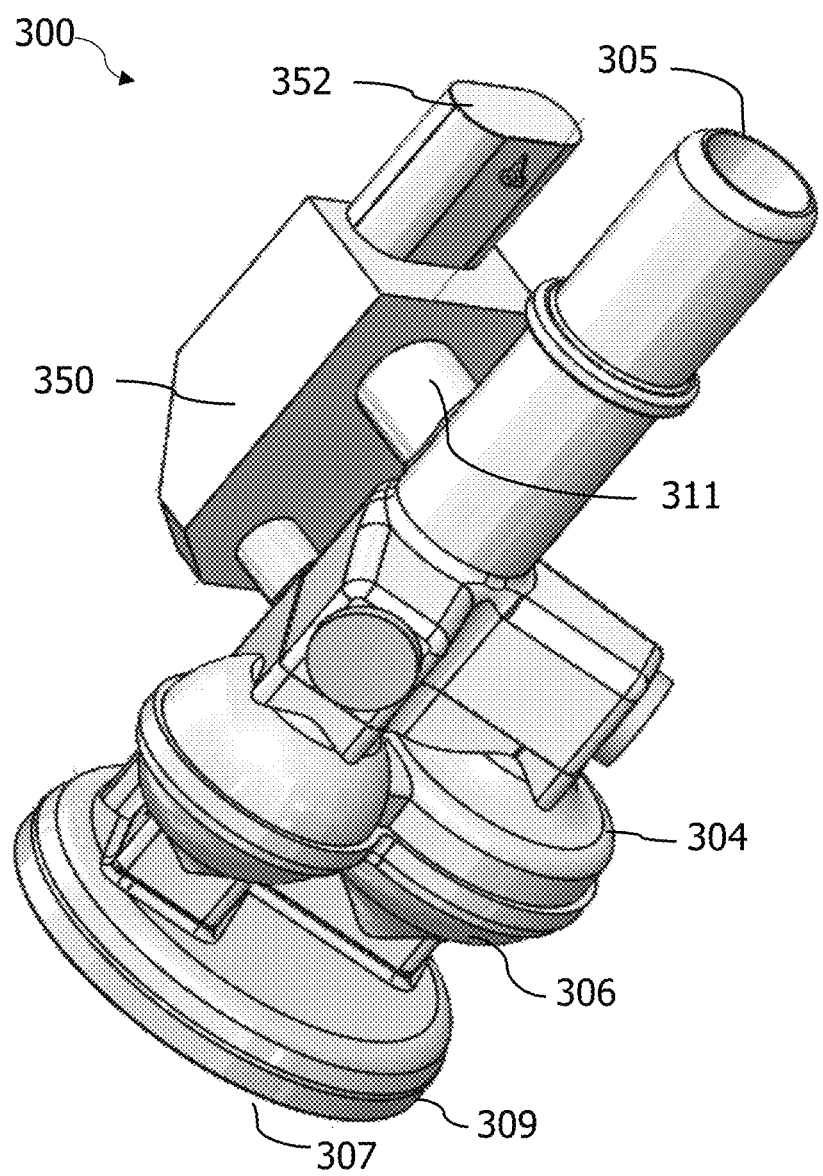
FIG. 15 is a side, perspective view of the second embodiment of the flow control device.

The first port 305 includes a sensor port 311 for a sensor such as a pressure sensor 350, shown in FIG. 15, to detect changes in pressure that will indicate a leak in the engine system. The pressure sensor 350 includes an electrical plug 352 for connection to an electrical source. The sensor portion of the pressure sensor 350 is in fluid communication with the sensor port 311 to be able to sense or measure parameters of the fluid and/or fluid flow within the flow control device.

Turning back to FIG. 12, the first conduit 132 defining the restrictor 133 is generally positioned centrally in the flow control device 300 between the normally closed check valve 135 and the normally neutral check valve 139. As described above for the first embodiment, the first conduit 132 is aligned with the first port 305 and the second port 207 along a central longitudinal axis A of the housing. The first conduit 132 may be molded of a suitable plastic separately from the first housing portion 304 and the second housing portion 306 and is inserted therein in registration therewith using mating registration features 147, 148. The restrictor 133 has the same characteristics, internal profile, and parameters described above.

The normally closed check valve 135 is a hemispherical poppet check valve that is spring biased into the closed position as illustrated in FIG. 3 and FIGS. 6-9. The hemispherical poppet check valve 135 has an internal cavity 210 defined by the fluid tight connection of the first housing portion 204 and the second housing portion 206. The internal cavity 210 is generally spherically shaped and defines an annular seat 212 for engagement with a hemispherical poppet sealing member 214, which is translatable between a closed position against the annular seat 212 (FIGS. 3 and 5-6) and an open position (FIG. 4). The generally spherical shape of the internal cavity 210 complements the shape of the hemispherical poppet sealing member 214 and provides a low restriction flow path in the open position. The annular seat 212 in a longitudinal cross-section through the check valve 135, as shown in FIG. 6, defines a convex spherical radius as indicated by arrow 213 in FIG. 7. The convex spherical radius of the annular seat 212 is preferably positioned or formed at a transition from the first port 205 into the internal cavity 210. The internal cavity 210 has a generally spherical shape as noted above and, in the closed position, a convex surface of the hemispherical poppet sealing member 214 as indicated by arrow 215 in FIG. 7 is engaged with the convex spherical radius 213 of the annular seat 212.

In all aspects, the flow control devices have a housing that is typically molded of plastic, such as, but not limited to, nylon 6, nylon 4/6, nylon 6/6 and/or polyoxymethylene. The sealing members of the check valve may be constructed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity at both low pressure differentials (such as 5 kPa) and at high pressure differentials (such as 200 kPa), and blends thereof. The flow control device is constructed of materials suitable for operation under a pressure range of 101 kPa to −80 kPa and a temperature range of −40° C. to 120° C. The flow control device is typically about 100 mm to about 200 mm in length, more preferably about 100 mm to about 150 mm in length.

The advantages and/or benefits of the flow control device include a simplified design of reduced size that does not require electromotive controls (i.e., it is a passive device) for either check valve and reduces the number of hose connection points. The reduced number of connections eliminates costs and potential leak points. Further, the flow control devices has a tunable normally closed check valve (adjust the spring, i.e., the spring force applied to the poppet sealing member) and a tunable restrictor by preselecting an orifice size suitable for the engine system, and customizable end connector sizes and styles, for example an end that connects permanently to the air box as shown in FIGS. 12-15. The spring can be tuned to open at a higher or lower pressure differential for different engine sizes.

In operation, the flow control device provides the advantage of enabling a pressure sensor to continuously check for leaks up- and down-stream of the flow control device due to constant flow through the restrictor's preselected orifice size. If the normally closed check valve does not open, the pressure sensor will sense an increased vacuum level, which will cause an error detection. And, if the normally neutral check valve fails to open, the pressure sensor will sense a higher pressure, which will cause an error detection.

Furthermore, the hemispherical poppet check valve provides additional advantages to the flow control device, such as a check valve that opens under low differential pressure and has low flow restriction once open. The low flow restriction in the open position is a result of the combined shapes of the generally spherical internal cavity and the upper surface of the hemispherical poppet sealing member (see the flow arrows in FIG. 3), more particularly, the internal flange of the first housing portion overlapping the rim of the second housing portion and defining matching contours once sealingly fixed together. This configuration also provides low audible noise when open and a no-leak seal when closed. Another advantage is that the check valve is not sensitive to the orientation of the flow control device in an engine system because the hemispherical poppet sealing member has a low mass, and does not move to the closed or open position under its own mass.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A crankcase ventilation breach detection system of an internal combustion engine comprising:
    an internal combustion engine having a crankcase and an intake manifold;
    a positive crankcase ventilation valve in fluid communication between the crankcase and intake manifold to regulate the flow of blow-by-gas from the crankcase to the intake manifold;
    a crankcase ventilation tube in fluid communication with air from an air intake and the blow-by-gas;
    a flow control device within the fluid flow path of the crankcase ventilation tube, the flow control device comprising a housing defining a plurality of parallel conduits comprising a first conduit having a normally closed check valve controlling flow through the first conduit, the normally closed check valve opening under a first preselected pressure differential in a first direction of flow from the air intake to the crankcase, and a second conduit having a normally neutral check valve that opens under a second preselected pressure differential in a second direction of flow from the crankcase to the air intake, and a third conduit defining a restriction profile that is continuously open and having a third preselected pressure differential; and
    a pressure sensor positioned between the parallel conduits and the crankcase, wherein detection of no pressure differential by the pressure sensor indicates a breach in the system.

2. The system as claimed in claim 1, wherein the internal combustion engine has a turbocharger and the crankcase ventilation tube connects upstream of the compressor of turbocharger.

3. The system as claimed in claim 2, wherein the second preselected pressure differential is the same or lower than the first preselected pressure differential.

4. The system as claimed in claim 1, wherein the first preselected pressure differential is greater than the third pressure differential, and the second pressure differential is the same or less than the third pressure differential.

5. The system as claimed in claim 1, wherein the flow control device has a first port in fluid communication with all of the plurality of parallel conduits and a second port in fluid communication with all of the plurality of parallel conduits, and the second port is shaped as a cap that is permanently attachable to the air intake.

6. The system as claimed in claim 5, wherein the cap has a radially outer flange and a radially inner flange and is adhered an opening of the air intake or welded to the opening of the air intake.

7. The system as claimed in claim 6, wherein welded includes spin welding, vibration welding, or induction welding.

8. The system as claimed in claim 7, wherein the flow control device includes a sensor port in the first port and a pressure sensor operatively connected to the sensor port.

9. The system as claimed in claim 8, wherein the pressure sensor detects increased vacuum levels if the normally closed check valve does not open and indicates an error, and the pressure sensor detects a higher than normal pressure if the normally neutral check valve does not open and indicates an error.

10. The system as claimed in claim 1, wherein the normally closed check valve comprises a hemispherical poppet check valve.

11. The system as claimed in claim 10, wherein the hemispherical poppet check valve, in a closed position, seats a convex surface of the poppet valve against a convex surface of the first conduit.

12. The system as claimed in claim 10, wherein the hemispherical poppet check value has a spring biasing the poppet sealing member to the closed position.

13. The system as claimed in claim 10, wherein the normally neutral check valve comprises a sealing disc translatable between an open position and a closed position in response solely to a pressure differential in the system, and the sealing disc is flexible and is bowl-shaped in the open-position and is flat in the closed position.

14. A flow control device comprising:
 a housing defining a plurality of parallel conduits comprising:
  a first conduit having a normally closed check valve controlling flow through the first conduit, wherein the normally closed check valve opens under a first preselected pressure differential in a first direction of flow;
  a second conduit having a normally neutral check valve that opens under a second preselected pressure differential in a second direction of flow that is opposite the first direction of flow; and
  a third conduit defining a restriction profile having a third preselected pressure differential.

15. The device as claimed in claim 14, wherein the first preselected pressure differential is greater than the third preselected pressure differential.

16. The device as claimed in claim 14, wherein the second preselected pressure differential is the same or lower than the first preselected pressure differential.

17. The device as claimed in claim 14, wherein the first preselected pressure differential is greater than the third pressure differential, and the second pressure differential is the same or less than the third pressure differential.

18. The device as claimed in claim 14, wherein the flow control device has a first port in fluid communication with all of the plurality of parallel conduits and a second port in fluid communication with all of the plurality of parallel conduits, and the second port is shaped as a cap that is permanently attachable to an air intake.

19. The device as claimed in claim 14, wherein the flow control device has a first port in fluid communication with all of the plurality of parallel conduits and defines a sensor port in the first port for connection to a pressure sensor, and a pressure sensor operatively connected to the sensor port.

20. The device as claimed in claim 14, wherein the normally closed check valve comprises a hemispherical poppet check valve and a spring biasing the hemispherical poppet sealing member to a closed position.

21. The device as claimed in claim 20, wherein the hemispherical poppet check valve, in the closed position, seats a convex surface of the hemispherical poppet sealing member against a convex surface of the first conduit.

22. The device as claimed in claim 14, wherein the normally neutral check valve comprises a sealing disc translatable between an open position and a closed position in response solely to a pressure differential in the second conduit, and the sealing disc is flexible and is bowl-shaped in the open-position and is flat in the closed position.

* * * * *